United States Patent

Mandalia et al.

[11] Patent Number: 5,907,598
[45] Date of Patent: May 25, 1999

[54] MULTIMEDIA WEB PAGE APPLICATIONS FOR AIN TELEPHONY

[75] Inventors: Baiju Dhirajlal Mandalia, Boca Raton; Pradeep Parsram Mansey, Coral Springs, both of Fla.

[73] Assignee: International Business Machines Corporation, Armonk, N.Y.

[21] Appl. No.: 08/803,407

[22] Filed: Feb. 20, 1997

[51] Int. Cl.⁶ .................................................. H04M 11/00
[52] U.S. Cl. .............................. 379/100.01; 379/100.17; 358/407
[58] Field of Search ....................... 379/100.12, 100.13, 379/100.14, 100.17, 100.08, 93.02, 93.07, 100.01; 358/407

[56] References Cited

U.S. PATENT DOCUMENTS

| | | | |
|---|---|---|---|
| 4,905,273 | 2/1990 | Gordon et al. | 379/93 |
| 4,969,184 | 11/1990 | Gordon et al. | 379/100 |
| 5,299,304 | 3/1994 | Williams et al. | 395/148 |
| 5,351,136 | 9/1994 | Wu et al. | 358/440 |
| 5,513,323 | 4/1996 | Williams et al. | 395/200.18 |
| 5,530,852 | 6/1996 | Meske, Jr. et al. | 395/600 |
| 5,608,786 | 3/1997 | Gordon | 379/100 |
| 5,675,507 | 10/1997 | Bobo, II | 364/514 |
| 5,742,668 | 4/1998 | Pepe et al. | 379/58 |
| 5,764,639 | 11/1998 | Staples et al. | 379/93.02 |

*Primary Examiner*—Curtis A. Kuntz
*Assistant Examiner*—M. Ramakrishnaiah
*Attorney, Agent, or Firm*—Richard A. Tomlin; Robert Lieber

[57] ABSTRACT

The disclosure allows for creation of special web-page repositories within subsystems of the present PSTN (public switched telephone network) that conform to present architectures for advanced intelligent network (AIN) constructs in telephony. Such repositories would be formed to receive facsimile (fax) telephone transmissions, convert them to HTML (Hypertext Markup Language) web page format, store the converted results and render the latter available for viewing simultaneously—under control of PSTN call management intelligence—to multiple users of the Internet and World Wide Web subject to authorization of would be viewers by the sending party. A typical application of this capability allows for a PSTN user setting up a voice conference to controllably distribute expository charts to other conference participants, via the Internet, thereby adding a video dimension to the voice conference without imposing a bandwidth strain on the PSTN voice networks currently handling the conference, and also allowing for the transmissions to be sent in an orderly manner coordinated with a given participant's voice presentation so that the conference participants can not merely compete in a random and potentially chaotic manner for making such graphic presentations to each other. Such repositories also would be useful to receive graphic information in forms other than that associated with present-day facsimile transmission; e.g. text generated by word processor and/or e-mail applications, or images generated by ordinary computer-graphic applications, all of which could be sent from computers to respective repositories/servers within the PSTN, via the Internet, after conversion by appropriately configured applets (e.g. mini-applications written in a language consistent with web browsers presently used on computers).

8 Claims, 3 Drawing Sheets

MULTIMEDIA WEB PAGE APPLICATIONS FOR AIN TELEPHONY

CROSS-REFERENCES TO RELATED APPLICATIONS

Patent application Ser. No. 08/792,018 by D. L. Acker et al—filed Feb. 3, 1997 and titled MULTISERVICE PLATFORM ARCHITECTURE FOR TELEPHONE NETWORKS—discloses an intelligent peripheral system consistent with existing architectural concepts for control of telephone processes in the public switched telephone network (PSTN).

The related architecture pertains to advanced intelligent network (AIN) concepts, in which telephone call processing and customer/user services related thereto, are handled by intelligent peripheral entities, each containing a network of computer systems and switching apparatus linked by data communication media. The referenced application concerns an intelligent peripheral system of that character which is organized as a multiprocessor wherein applicational responsibilities for implementation of customer/user service functions (call waiting, call forwarding, speech recognition, etc.) are distributed among plural processors, and which is structured to allow for communication with networks external to the PSTN, the latter including the Internet.

The present invention concerns a specific service application which could be advantageously deployed in AIN networks—especially networks containing intelligent peripherals of the type disclosed in the referenced application—with potential service benefits to users of the PSTN and commercial benefits to providers of associated services.

BACKGROUND OF THE INVENTION

As in the above cross-referenced application, the PSTN is defined presently as the aggregate world-wide of all equipment (both land-based and radio equipment) operating to interconnect telephones used by members of the public at large, but excluding equipment restricted to specific users (e.g. networks formed by PBX's, Centrexes, etc.) as well as public data networks such as the Internet. Although connections to the Internet are formed through the PSTN, for this application the Internet itself is viewed as external to the PSTN.

Today, the PSTN supports both voice telephone and facsimile (fax) type transmissions between its customers/users. Fax transmissions are conducted between special purpose fax machines, between computers using so-called "fax modems", and between special purpose fax machines and computers equipped with fax modems. However, present handling of fax transmissions is inadequate for many PSTN users.

For example, a user preparing for a voice conference with other users, and having a number of charts to present, can not simply broadcast facsimile copies of the charts to all prospective conference attendees, and transmitting such copies sequentially to prospective attendees requires that an operating fax machine or the equivalent be closely accessible to each prospective attendee, and also pre-supposes that all of the fax machines so deployed will operate satisfactorily (not fail) during the transmissions.

Also, there are times when it would be desirable to be able to concurrently transmit voice and graphic or text images through the PSTN—e.g. during conference calls between PSTN users having suitable viewing equipment—and present PSTN facilities do not allow for this to be accomplished in a manner that would be both cost effective to PSTN users and add minimal bandwidth stresses to the existing PSTN transmission infrastructure.

The present invention is directed to offering an effective solution to these problems within the PSTN which requires virtually no change to existing transmission infrastructures of the PSTN, and minimal software changes to intelligent peripheral entities presently contemplated for AIN facilities of the PSTN.

SUMMARY OF THE INVENTION

In accordance with the present invention, a server internal to the PSTN is used to provide a facsimile (fax) transmission interface between intelligence (i.e. intelligent peripherals) of an AIN facility, at a regional node of the PSTN, and public data transmission networks external to the PSTN such as the Internet and World Wide Web. PSTN users, who subscribe to a special "cross-network" fax service offered at the respective regional node (which service is uniquely associated with the present invention), call (dial or tone key) a special (local or regional) telephone number assigned to their service, respond to recorded vocal prompts to enter information unique to each user, and then proceed to transmit facsimile information to that number in otherwise conventional fashion. As in ordinary telephone facsimile transmissions, the information sent can be a bit-mapped image of text and/or graphics/pictures.

Such transmissions are intercepted by the respective AIN intelligence, converted to a format suited for reproducible construction of an image page on the Internet or Web (e.g. a format such as HTML or Hypertext Markup Language), and stored by the interfacing server at a URL (Uniform Resource Location) or net "address" assigned to the respective user. Thereafter, individuals authorized by the user who sent the original fax image can access the external data network (e.g. the Internet) via execution of standard "browser" software applications on their computers (e.g. browser applications such as Netscape's Navigator which are now ubiquitously available on millions of computers), request access to certain data resulting in a prompt from the browser to enter a PIN (personal identification number) uniquely associated with the URL and a pre-arranged password, and receive a downloaded copy of the stored image(s) associated with the original transmission in a form displayable on the requester's computer monitor. The PIN and password can be given to these individuals by the original transmitting user; e.g. in a voice telephone conversation or conference.

Advantages of this type of document sharing (by the fax sender and web requesters authorized by the sender), over other/prior types of document sharing involving use of standard fax transmission and reception equipment are: 1) it enables a sender to effectively broadcast document images to multiple parties with one call and one fax sending process; 2) it allows for distribution of images from either paper/hard copy sources or computer data file sources using standard fax transmission equipment; 3) it's central management by regional AIN intelligence within the PSTN ensures that distributions are conducted on a secure basis and that distributed data can be made available to a large population of potential viewers (e.g. any of today's web users, subject to appropriate authorization) at a lower cost than would be possible if the distributed data were routed by standard handling in point-to-point fax transmissions from sender to individual receivers, one at a time; and 4) it permits the PSTN to add a (still) video dimension to a voice teleconference without imposing the bandwidth strains associated with picture transmission on PSTN networks currently handling the teleconference.

These and other aspects, features, and uses of the invention will be more fully appreciated from the following description.

DETAILED DESCRIPTION

Figure 1:
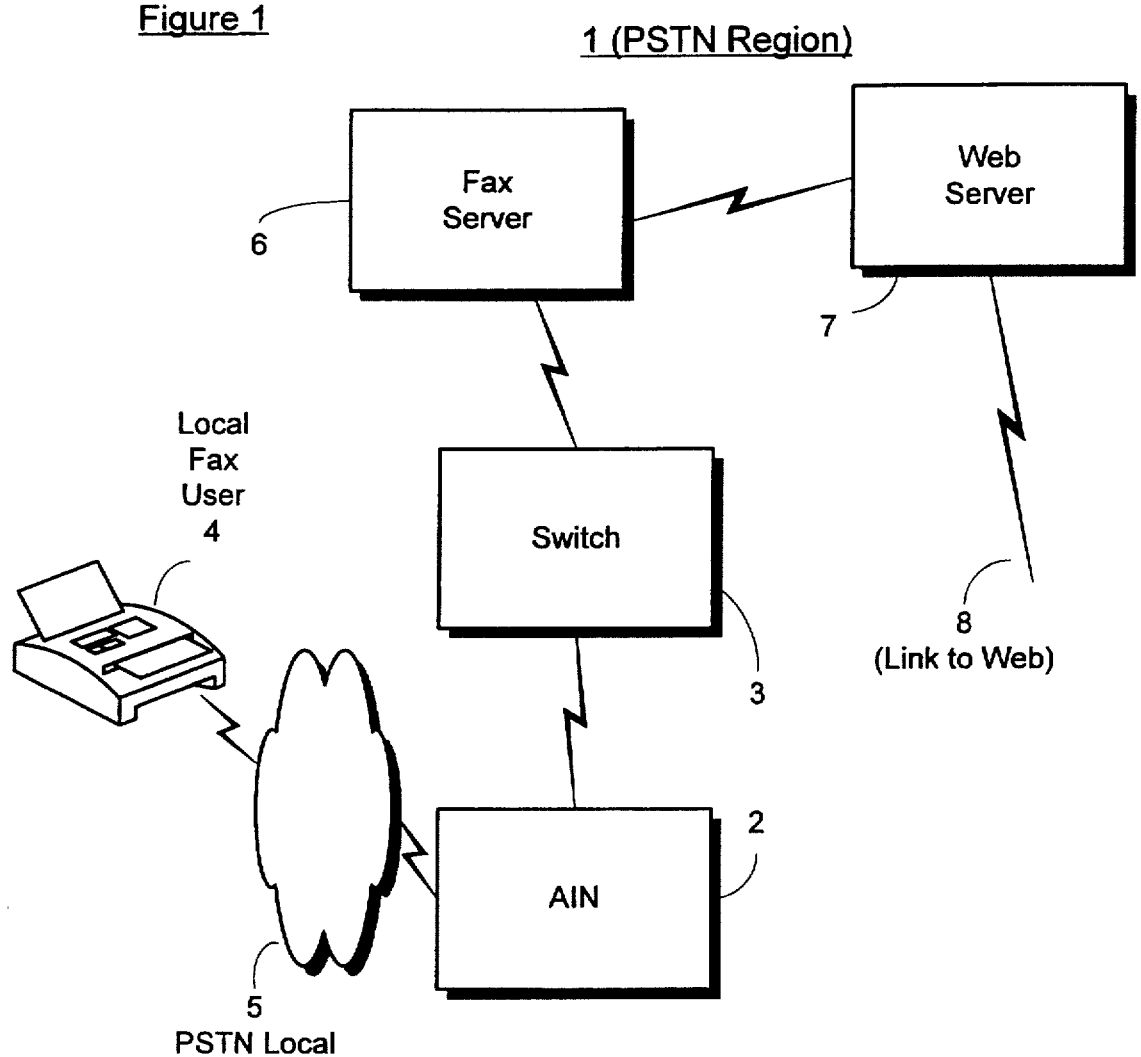
FIG. 1 is a schematic of a PSTN regional call management facility configured in accordance with the present invention.

FIG. 1 illustrates PSTN facilities for controlling routing and handling of fax (facsimile) telephone line transmissions originating in a region 1 served by the facilities. The facilities include a network 2, which conforms to principles of AIN (Advance Intelligent Network) architecture presently adhered to by most telephone carriers operating within the PSTN, and one or more switching complexes 3 through which telephone call connections are formed between local and trunk telephone lines serving the region. The local lines include lines connecting fax equipment at a residence or business 4 to AIN network 2 through a local portion of the PSTN shown at 5.

AIN network 2 includes a network of computers forming an intelligent peripheral system for directing the routing of telephone calls and the application of customer services (e.g. call waiting, call forwarding, etc.) to the calls. For executing service functions associated with the present invention with high efficiency and fail-safeness, this network may be constructed in accordance with the disclosure of the cross-referenced co-pending patent application by D. L. Acker et al.

In accordance with the present invention, facilities in region 1 include a fax server 6 and a web server 7, the latter linked to the web/Internet as suggested at 8. Servers 6 and 7 are computer systems programmably adapted in a manner to be described below for selectively processing fax transmissions to enable document images represented by such transmissions to be viewed by certain pre-authorized users of an external public data network such as the web (world wide web) or Internet. Such computers may be either distinct processors, programmably shared portions of a common processor, or programmably shared portions of service management and call routing processors within network 2.

Figure 2:
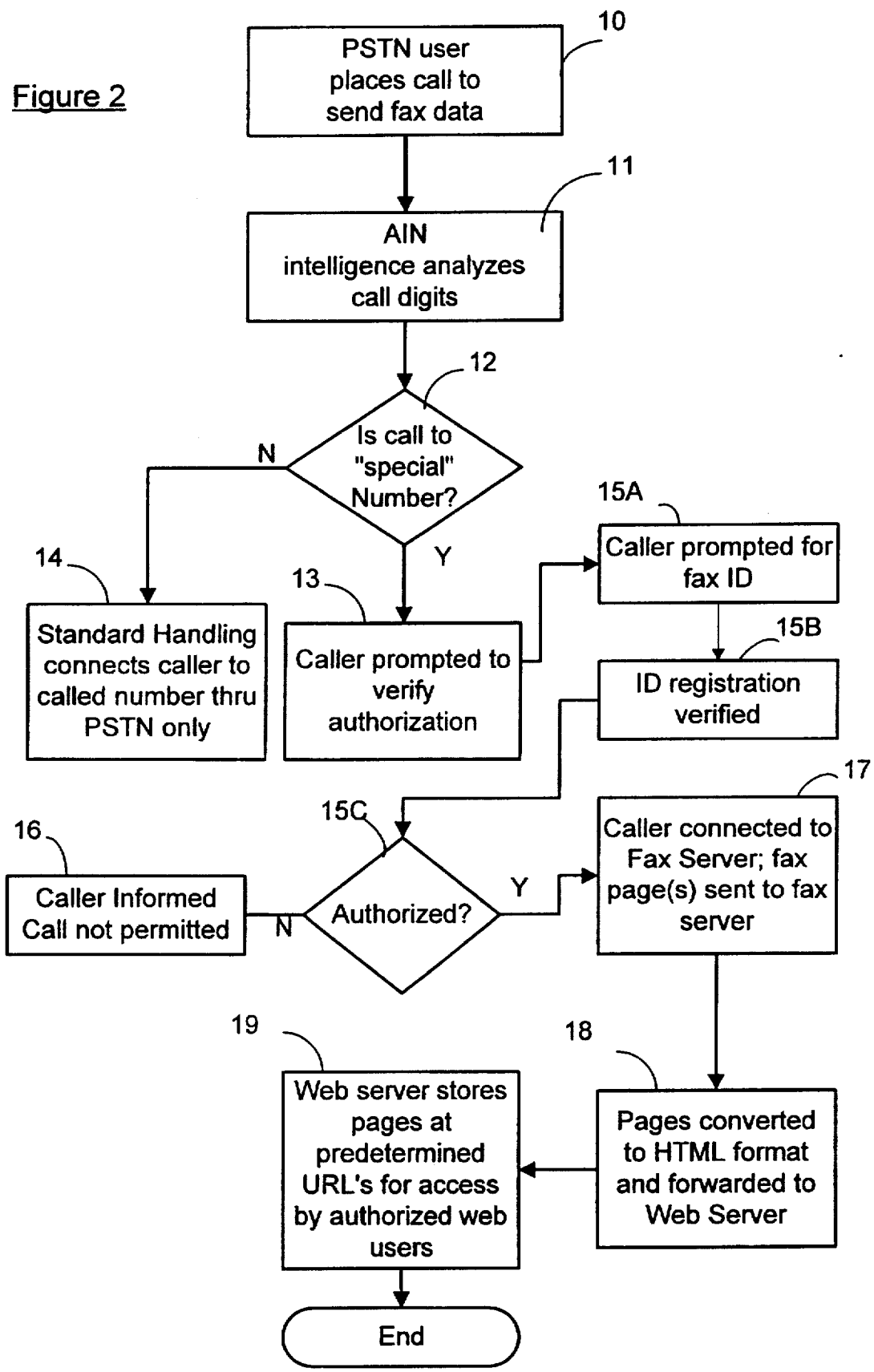
FIG. 2 is a flow diagram illustrating how intelligence within the facility of FIG. 1 is adapted (e.g. programmably) to route locally originated fax calls in accordance with the invention and how certain fax signals so routed are processed in accordance with the invention.
Figure 3:
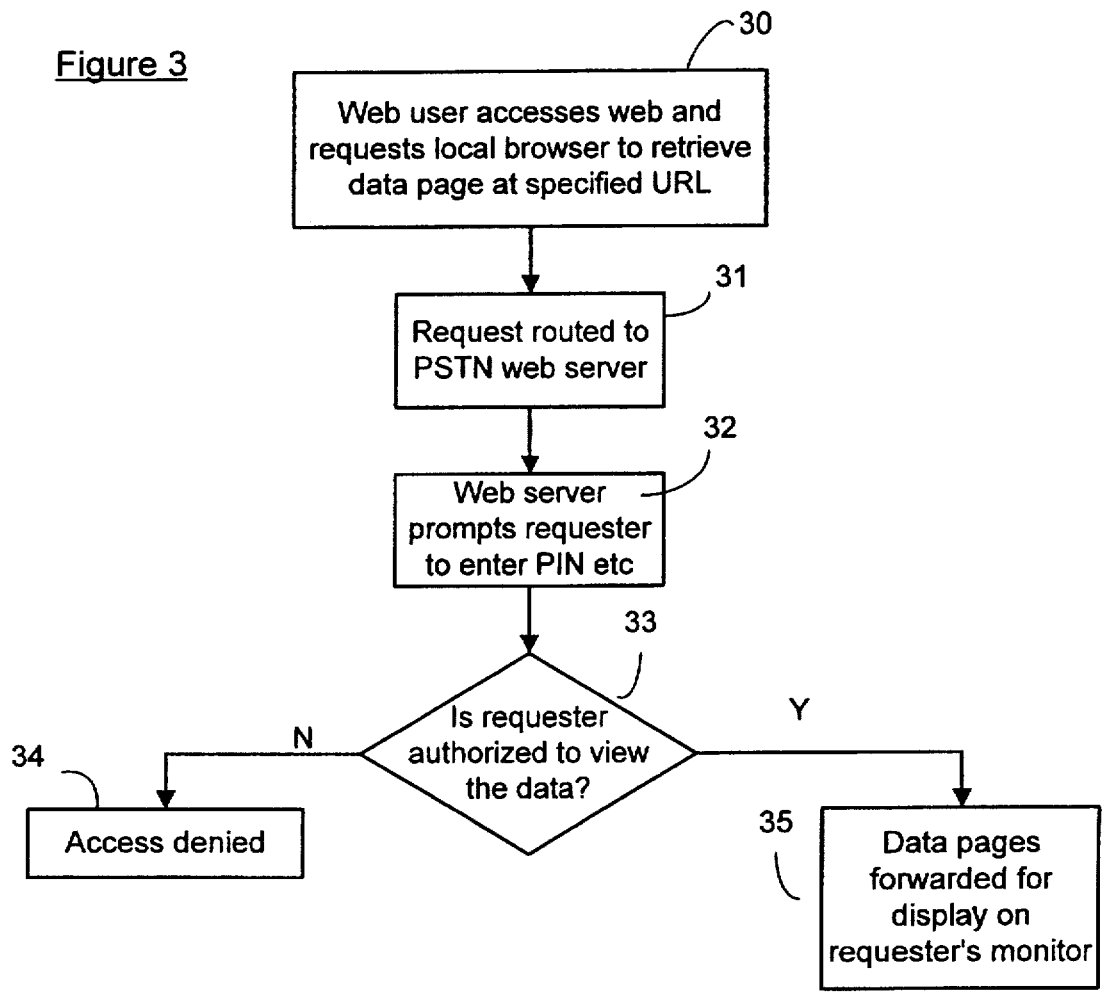
FIG. 3 is a flow diagram showing how fax image data stored within the PSTN is made available to users of an external data network such as the web subject to verification of authorization of such users to view the images.

Program applications selectively operate servers 6 and 7, in the manner indicated in flow diagrams respectively shown in FIGS. 2 and 3, to perform a predetermined fax routing and signal handling service associated with the present invention. In this service, a user of the PSTN subscribing to the service is given a predetermined "special" telephone number to call for distributing fax type images to individuals preselected by the user; e.g. to parties to a conference telephone call in which the user is participating (possibly even while the call to the predetermined number is being placed). When the user operates fax equipment to dial the predetermined number—e.g. over a line separate from one on which a conference call is currently active—the AIN intelligence within the local region serving that user acts to verify that the user is either a subscriber to the predetermined service to be described, or a party authorized by a subscriber to make use of that service. If the caller's authorization is appropriate, the call is routed to the local/regional fax server (e.g. server 7, FIG. 1) for special handling.

In such special handling, fax signals sent from the caller's fax equipment are converted to a format suitable for presentation on computers linked to the external network and stored in that format, at a location accessible to the server interfacing to the external network (e.g. web server 7, FIG. 1). When so stored, document images represented by the converted signals are viewable by certain authorized users of the external network; for example, remote participants in an aforementioned conference call having appropriate access authorization from the sender. These pre-authorized viewers may view the stored images either simultaneously or one at a time, and their viewing may coincide with an active voice telephone conference in which they are participants.

FIG. 2 shows how a dialed (tone keyed) call from a fax sender and fax/image data sent by the sender are to be handled by AIN intelligence in accordance with this invention.

The number dialed by the sender's fax equipment (process step 10, FIG. 2) is analyzed by the local/regional AIN intelligence (process step 11, FIG. 2). This analysis leads to a determination (step 12, FIG. 2) as to whether the call is or is not directed to a special telephone number, preferably within the local area of the caller's fax line, which special number is associated with providing services in accordance with the present invention to forward subsequent image data through the Internet or web via the routing and processing apparatus shown in FIG. 1.

If the call is to the special number, the call involves additional special handling (step 13) described below. However, if the call is to other than the special number, the call is handled in standard fashion (step 14) to establish a connection, only within the PSTN, between the caller's fax equipment (or computer modem and fax application) and remote fax equipment (or computer modem and fax application) at a location designated by the called number. In such standard handling, once the connection is made, data signals representing bit-mapped fax images are sent directly through the connection from the caller's fax equipment to the remote fax equipment without additional routing by AIN intelligence.

If the call is to the special number, a process suggested at 15A, 15B and 15C is performed to verify the caller's authorization to use services associated with that special number. At 15A, the caller is prompted to enter a fax "id" (identification) number (e.g. by a pre-recorded voice announcement). This id number is assigned to the customer owning the caller's fax telephone line, when the customer subscribes to the presently described service, is thereafter usable by either that customer or a user authorized by that customer, and uniquely represents the caller's authorization to use the subject service. The id number may be entered, for example, either by automatic transmission of pre-programmed tones from the caller's fax equipment, or by manual operation of tone keys on a telephone linked to the caller's fax equipment.

When the AIN intelligence receives the entered number, it checks a local database to verify that the number is currently registered to an active subscriber (step 15B).

The decision that the caller is or is not authorized to use the subject service, indicated at 15C, is determined by the response to the prompt at 15A. If there is no response, or if the entered number entered as a fax id is not currently registered to an active subscriber, the caller is informed, for instance by a recorded announcement, that the call is not permitted (step 16) and the caller's line is disconnected. If a valid/active id is received (by the AIN intelligence), the caller's line is connected to a fax server providing the subject service (step 17); e.g. a fax server such as server 6, FIG. 1, and thereafter that server interacts directly with the caller's fax equipment to receive fax data signals (e.g. representing a bit-mapped document image) from that equipment in standard telephone line format.

The received signals are converted by the fax server to a format suitable for presentation over the external data network; e.g. to HTML (Hypertext Markup Language) format suited for presentation on the web and forwarded to a web server managed by the AIN intelligence (process steps 18, FIG. 2). The converted signals are stored by the web server at an address associated with a predetermined address on the external network; e.g. a URL (Universal Resource Location) of the type commonly employed today on the web (process step 19, FIG. 2). Those skilled in the art will understand that the conversion and forwarding actions of step 18 may be performed in reverse sequence, with the web server then performing the conversion on signals sent to it in standard telephone line format.

FIG. 3 shows how converted signals stored in the manner described at process step 19, FIG. 2, are made available to parties who may be pre-authorized by the fax caller to view their image content. In this figure, it is assumed that the external network is the web, and users of that network have computers (e.g. personal computers) equipped with conventional browser software applications (e.g. Netscape's Navigator[1]) enabling the users to request access to remote data and have their requests routed to URL addressess associated with the data. Accordingly, process step 30 in this figure indicates request action by a web user effectively calling for access to data stored in association with the predetermined URL selected in process step 19 of FIG. 2. This type of request is routed to the PSTN web server controlling access to data stored by subscribers to the PSTN service associated with the invention (process step 31, FIG. 3).

[1]Netscape and Navigator are believed to be trademarks of Netscape Communications company Upon receiving such a request, the PSTN web server interacts with AIN intelligence of the respective PSTN region to prompt the requester for identification (process step 32, FIG. 3); e.g. to prompt the requester to enter a PIN (personal identification number) number which, if the requester is a party authorized by the fax sender to view data stored at the respective URL address, would be a number given to the requester by the sender of the fax data prior to the issuance of the requester's request. The prompts also could call for entry of other information identifying the requester's authorization (e.g. the requester's name, to be compared with a list of names previously furnished to the regional AIN intelligence by the fax sender).

Using information entered by the requester in response to such prompts, the web server determines if the requester is or is not duly authorized to view the (converted fax image) data stored at the URL address indicated in the request (decision steps 33, FIG. 3).

If it is determined that the requester is not authorized to view the data, the request is denied (process step 34, FIG. 3). However, if it is determined that the request is legitimate, the data is transferred over the web to the requester's computer/browser and processed by the latter to form display images on the requester's computer monitor which correspond to the original images sent by the fax sender (process 35, FIG. 3).

As noted earlier, this type of "broadcast" distribution of images sent from a single fax transmitter has advantages over standard fax transmission procedures: 1) it enables a sender to effectively broadcast document images to multiple parties with one call and one fax sending process; 2) it allows for distribution of images from either paper/hard copy sources or computer data file sources using standard fax transmission equipment; 3) it's central management by regional AIN intelligence within the PSTN ensures that distributions are conducted on a secure basis and that distributed data can be made available to a large population of potential viewers (e.g. any of today's web users, subject to appropriate authorization) at a lower cost than would be possible if the distributed data were routed by standard fax handling in point-to-point fax transmissions from a sender to individual receivers, one at a time; and 4) it permits the PSTN to add a (still) video dimension to a voice teleconference without imposing the bandwidth strains associated with picture transmission on the PSTN voice networks currently handling the teleconference.

Provision of the foregoing Internet routing service through the AIN intelligence of the PSTN allows telephone companies to offer tailored services based on fax features (e.g. services tailored to different types of fax signals originated by customer's using conventional fax equipment and customers using only computers and modems to emulate fax transmissions). Furthermore, concentration of such capabilities within AIN intelligence in the PSTN allows for comprehensive accounting for and billing for such services that would be unfeasible otherwise.

We claim:

1. In a call management system for the PSTN (public switched telephone network) a facility for adapting said call management system to provide a cross-network document distribution service between the PSTN and a data network external to the PSTN, said service being useful to receive and store information represented by signals transmitted to said service via the PSTN by an authorized user of said service, said information representing a viewable document, to receive instructions from a said subscriber pre-designating multiple authorized viewers of a respective document, and to allow access to said document by said multiple viewers via said external data network, said adapting facility comprising:

apparatus internal to said PSTN, and operating in conformance with AIN (Advanced Intelligent Network) architecture specifications of said PSTN, for receiving signals representing said viewable document information from facsimile transmitting apparatus connected to said PSTN and operated by a said authorized user;

means for storing said received information; and means coupled to said information storing means for enabling any of said multiple authorized viewers pre-designated by the respective user to obtain access to said stored information via an address on said external data network having a predetermined association to the location in storage of said stored information.

2. An adapting facility in accordance with claim 1 wherein said access enabling means includes:

server apparatus interfacing to said external data network, said server apparatus being capable of making said stored information simultaneously accessible to plural said pre-authorized viewers via said associated address on said external data network.

3. An adapting facility in accordance with claim 2 wherein said access enabling means further includes:

security means for requiring each party accessing said predetermined network address to undergo an identification procedure effectively proving that the respective party is one of said pre-authorized viewers.

4. An adapting facility in accordance with claim 3 wherein said external data network is the Internet, said facility including:

format converting means intermediate said receiving apparatus and said storing means for converting said received signals from a first format associated with transmissions internal to the PSTN to a second format suitable for conveyance of respective information through the Internet.

5. An adapting facility in accordance with claim 4 wherein said second format is a format associated with Hypertext Markup Language (HTML).

6. An adapting facility in accordance with claim 1 wherein said external data network is capable of linking to multiple said authorized viewers simultaneously, and wherein said facility includes means interfacing to said external data network for making said stored information simultaneously accessible to plural said authorized users via an address on said external data network having a predetermined association to the storage location of said stored information.

7. An adapting facility in accordance with claim 6 wherein said internal apparatus in said PSTN is capable of supporting a voice telephone conference between said authorized user and said pre-authorized viewers, and wherein said stored information represents a copy of a document to be viewed by said pre-authorized viewers during and in association with said voice conference.

8. In a telephone call management system for the PSTN (public switched telephone network), a facility for adapting said call management system to provide users of said PSTN with an electronic document distribution service enabling a user subscribing to said service to have information representing a viewable document transmitted from that subscribing user to multiple parties pre-authorized by the subscribing user to view said viewable document; said adapting facility comprising:

server means internal to said PSTN, said server means operating in conformance with AIN (Advanced Intelligent Network) architecture specifications of said PSTN for linking said call management system to a data communication network external to said PSTN; said external data communication network having a characteristic predetermined first signal format for transmitting data signals between said server means and users of said data network;

signal receiving means in said AIN call management system for receiving information signals transmitted by a said subscribing user of said service through a connection internal to said PSTN, said transmitted signals representing a viewable document and being arranged in a predetermined second format different from said predetermined first format;

means for converting said received signals from said second format to said first format;

means for storing said converted signals; and means coupled to said storing means and said server means for selectively transmitting said stored converted signals to a restricted class of users of said external data network representing said pre-authorized parties.

* * * * *